Figure 1:
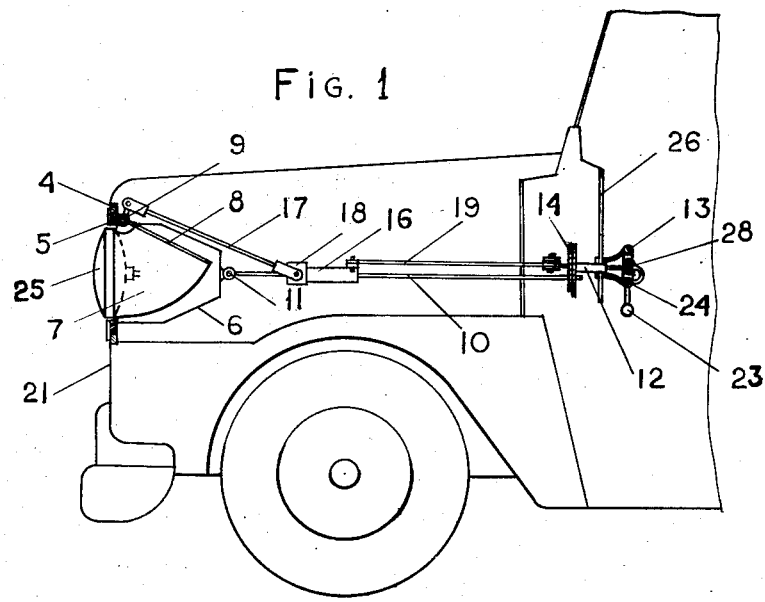
Figure 2:
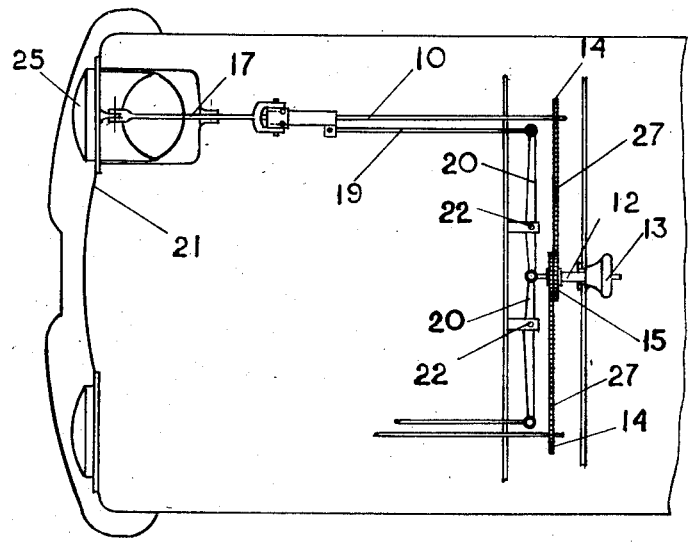

June 30, 1959 V. I. KOUMP 2,892,928
REVOLVING HEADLIGHTS
Filed July 20, 1956

INVENTOR.
BY Vladimir I. Koump

United States Patent Office 2,892,928
Patented June 30, 1959

2,892,928

REVOLVING HEADLIGHTS

Vladimir Ivanovich Koump, Elmhurst, N.Y.

Application July 20, 1956, Serial No. 599,244

1 Claim. (Cl. 240—61.6)

The object of this invention was to provide simple and reliable means by which an operator of a modern vehicle could, by remote controls, direct the beams of the headlights of the vehicle in any direction, within a wide angle from the normal position of the beams.

Installed in a conventional automobile, such dirigible headlights would perform the following useful functions: they would allow the operator to diminish the blinding effect of the headlights of his vehicle on the oncoming vehicle by deflecting the beams of the headlights of his vehicle: if they could be manipulated over a wide angle, the dirigible headlights could serve as search lights when need arises.

More specifically, then, the object of this invention was to develop a scheme for dirigible headlights for vehicles having internal type headlights, which would permit manipulation of the beams of the headlights over a maximum angle of 80 degrees in any direction from the normal position of the beams. It is believed that a unique and non-obvious solution has been found which will be described with reference to the attached drawings.

In the accompanying drawings:

Fig. I is a side view of the proposed construction.

Fig. II is a top view of the proposed construction.

Like numerals designate corresponding parts in all figures of the drawing.

The revolving headlight structure for vehicles consists of stationary ring 4 attached rigidly to the body of the vehicle 21; and ring 5, concentric to the stationary ring 4, and of outside diameter somewhat smaller than the inside diameter of the ring 4; the inner ring 5 has a groove on its outside edge and stationary ring 4 has a corresponding projection on its inside edge so that ring 5 is free to rotate in the plane of the ring 4 but cannot be removed from the ring 4. A cylindrical headlight cavity 6 shown with tapered edges is rigidly attached to the side of the inner ring 5 and hence, is free to rotate with it. A torus segment 7 of outside diameter substantially equal to the diameter of the body of a headlight (can be visualized as a segment cut out from the doughnut-like shell), houses the body of the headlight in its front end. Angle shaped lever 8, having a short arm, a long arm and a pivot point 9 at the bend, is attached to the inner ring 5 at the pivot point 9 in such a way that it is free to rotate about the pivot point 9; the long arm of the lever 8 is rigidly attached to the rear end of the torus segment 7. The cavity turning rod 10 is rigidly attached to the headlight cavity at point 11, so that the structure comprising headlight cavity 6, inner ring 5, body of the headlight 25, torus segment 7 and the angle shaped lever 8 can be rotated in the plane perpendicular to rod 10 by turning rod 10. A control rod 12, one end of which projects through the control board 26 of the vehicle has the other end connected to the short arm of the lever 20 by a pin joint. Gear 14 is rigidly attached to the rod 10; second gear 15 is placed on rod 12 and is coupled with rod 12 in a way which permits transmission of substantial torque from the rod 12 to the gear 15 and, at the same time, permits substantial axial displacement of rod 12 with respect to gear 15. A drive chain 27 connects gears 14 and 15 so that rotational motion of the rod 12 can be transmitted to rod 10. Control handle 13 is attached to the control board 26 of the vehicle in such a way that it is free to rotate in the plane of the control board 26 and is coupled with rod 12 in a way which permits transmission of substantial torque from the handle 13 to the rod 12, and allows the rod 12 to move axially with respect to the handle 13. Hollow member 16 fits onto rod 10 and is free to slide along it. A sleeve 18 is attached to it in a way which permits sleeve 18 to rotate freely on the hollow member 16 but prevents displacement of sleeve 18 along the hollow member 16. Angle shaped lever pushing rod 17 connects the short arm of the lever 8 and the sleeve 18 of the hollow member 16: in both cases the coupling is provided by pin joints. Straight lever 20 rotates freely about the pivot point 22. Hollow member pulling rod 19 has pin joints at both ends and connects the body of the hollow member 16 and the long arm of the lever 20. Control lever 23 is attached to the control handle 13 at the pivot point 24 and is connected to the projecting end of the rod 12 by a pin joint 28.

The functions of various components of the proposed structure and the manner of the operation of the system by the vehicle operator will be illustrated by way of the following example. Suppose it is desired to direct the headlights of the vehicle to a point on the left side of the vehicle at an elevation higher than the headlight elevation, the operator would pull control lever 23, thus causing forward movement of rod 12, and through the straight lever 20, the movement of rod 12 will be transmitted to rod 19 and hence to hollow member 16 which, in turn, will slide on the rod 10 away from the headlight cavity 6 and by the action of rod 17 cause the angle shaped lever 8 to rotate clockwise about the pivot point 9. As a result the headlight 25 of the torus segment 7 will slide out of the headlight cavity, thus moving the beam of the headlight upward. The second step will involve rotating the control handle 13 counterclockwise. Rotational movement of the control handle 13 will be transmitted through the rod 12, gears 14 and 15 and chain 27 to the rod 10, and thus the whole structure comprising headlight cavity 6, inner ring 5, lever 8, headlight 25 and the torus segment 7, will turn counterclockwise. During the rotational movement of the above structure the sleeve 18 of the hollow member 16 will rotate counterclockwise with respect to the hollow member 16.

Although a specific structure has been described and illustrated it is understood that the present invention is not limited to the exact construction set forth, but includes within its purview such changes as may be made within the scope of the appended claim.

I claim:

A revolving headlight structure for vehicles comprising a stationary ring attached rigidly to the body of the vehicle: an inner ring, concentric to the stationary ring, of outside diameter smaller than the inside diameter of the stationary ring; means for effecting rotation of the inner ring in the plane of the stationary ring; a cylindrical headlight cavity attached rigidly to the inner ring; a torus segment, the body of the headlight being attached to the front end of said segment; an angle shaped lever pivotally attached to the side of the inner ring in such a way that said lever is free to rotate about the pivot point, a longer arm of said lever being rigidly attached to the rear end of the torus segment; a cavity turning rod rigidly attached to the headlight cavity; a control rod, one end of which projects through the control board of the vehicle, the other end being connected to the short arm of a straight lever by a pin joint; a first gear rigidly attached to the free end of the cavity turning rod, a second gear attached to one end of the control rod in such a manner as to permit substantial axial displacement of the control rod with respect to the second gear; a drive chain connecting said gears so that rotational motion of the control rod can be transmitted to the cavity turning rod; a control handle attached to the control board of the vehicle in such a way that said handle is free to rotate in the plane of the control board, said handle being coupled to the control rod by means permitting transmission of substantial torque from the control handle; a hollow member sliding freely on the cavity turning rod; a sleeve concentric to said hollow member rotating freely on said hollow member but unable to move axially along said hollow member, an angle shaped lever pushing rod, having a pin joint at each end thereof, and connecting the sleeve of the hollow member and the short arm of the angle shaped lever; a straight lever pivotally attached to the body of the vehicle; a hollow member pulling rod, pin joints at each end thereof connected to the body of the hollow member and the longer arm of the straight lever; and a control lever pivotally attached to the periphery of the control handle and connected to the control rod by a pin joint, whereby axial motion of said control rod may be effected by said control lever and rotation of said control rod is obtained by rotation of said control handle.

References Cited in the file of this patent

UNITED STATES PATENTS

| | | |
|---|---|---|
| 1,398,262 | Gray | Nov. 29, 1921 |
| 1,697,242 | Hill | Jan. 1, 1929 |
| 2,066,981 | Koca | Jan. 5, 1937 |
| 2,185,012 | Blazier | Dec. 26, 1939 |
| 2,639,367 | Chiuzzi | May 19, 1953 |
| 2,734,997 | Frady | Feb. 14, 1956 |

FOREIGN PATENTS

| | | |
|---|---|---|
| 425,895 | Great Britain | Mar. 22, 1935 |